United States Patent
Bo et al.

(10) Patent No.: US 12,430,364 B2
(45) Date of Patent: Sep. 30, 2025

(54) PERFORMANCE OF ROW TABLE TO COLUMNAR TABLE REPLICATION

(71) Applicant: INTERNATIONAL BUSINESS MACHINES CORPORATION, Armonk, NY (US)

(72) Inventors: Xue Bo, ChangPing district (CN); Xiaobo Wang, Beijing (CN); He Fang Zhang, Beijing (CN); Yu Liu, Beijing (CN); Peng Hui Jiang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 17/809,572

(22) Filed: Jun. 29, 2022

(65) Prior Publication Data
US 2024/0004902 A1    Jan. 4, 2024

(51) Int. Cl.
| | |
|---|---|
| G06F 16/28 | (2019.01) |
| G06F 16/22 | (2019.01) |
| G06F 16/23 | (2019.01) |
| G06F 16/2458 | (2019.01) |

(52) U.S. Cl.
CPC ........ *G06F 16/283* (2019.01); *G06F 16/2282* (2019.01); *G06F 16/2379* (2019.01); *G06F 16/2462* (2019.01)

(58) Field of Classification Search
None
See application file for complete search history.

(56) References Cited

U.S. PATENT DOCUMENTS

| 8,782,100 B2 | 7/2014 | Yoon | |
|---|---|---|---|
| 11,126,616 B2 | 9/2021 | Gitelman | |
| 11,243,966 B1* | 2/2022 | Wong | G06F 16/244 |
| 2005/0165733 A1* | 7/2005 | Strovink | G06F 16/283 |
| 2005/0289129 A1 | 12/2005 | Schmitt | |
| 2008/0177839 A1* | 7/2008 | Chang | H04L 67/565 |
| | | | 709/205 |

(Continued)

FOREIGN PATENT DOCUMENTS

| CN | 106716409 A | 5/2017 |
|---|---|---|
| CN | 106874437 A | 6/2017 |

(Continued)

OTHER PUBLICATIONS

Salaki et. al., "Extract transformation loading from OLTP to OLAP data using pentaho data integration", 2016 IOP Conf. Ser.: Mater. Sci. Eng. 128 012020 (Year: 2016).*

(Continued)

*Primary Examiner* — Aleksandr Kerzhner
*Assistant Examiner* — Anugeetha Kunjithapatham
(74) *Attorney, Agent, or Firm* — Teddi Maranzano

(57) ABSTRACT

A method, computer program product, and computer system are provided. Statistics for each columnar table are extracted from an online analytical processing (OLAP) database catalog. A transaction table map is created from transaction log records of an online transaction processing (OLTP) database. The transaction table map includes a counter of log records in a transaction and a timestamp indicating a longevity of the transaction. Based on the counter or the longevity exceeding a predefined threshold, the transaction is transformed, and sent to the OLAP database where it is replayed.

13 Claims, 6 Drawing Sheets

(56) References Cited

U.S. PATENT DOCUMENTS

| | | |
|---|---|---|
| 2013/0166554 A1 | 6/2013 | Yoon |
| 2014/0172776 A1 | 6/2014 | Liu |
| 2015/0006466 A1 | 1/2015 | Tonder |
| 2015/0142949 A1* | 5/2015 | Nair ........................ H04L 67/10 |
| | | 709/224 |
| 2016/0078085 A1* | 3/2016 | Hu ........................ G06F 16/273 |
| | | 707/765 |
| 2018/0107705 A1* | 4/2018 | Gitelman .............. G06F 16/254 |
| 2019/0102415 A1* | 4/2019 | Bishnoi ................ G06F 16/244 |
| 2019/0325055 A1 | 10/2019 | Lee |
| 2020/0334245 A1 | 10/2020 | Plattner |
| 2022/0092069 A1* | 3/2022 | Hartsing ........... G06F 16/24544 |
| 2023/0063730 A1* | 3/2023 | Chen ................... G06F 16/2379 |

FOREIGN PATENT DOCUMENTS

| | | |
|---|---|---|
| EP | 2608072 A | 6/2013 |
| JP | 2020013318 A | 1/2020 |
| KR | 101562359 B1 | 10/2015 |
| WO | 2024001333 A1 | 1/2024 |

OTHER PUBLICATIONS

Vernon, "Efficiently Update Data From OLTP To OLAP", accessed via "https://www.sqlserverscience.com/t-sql/update-data-oltp-olap/", Feb. 11, 2019 (Year: 2019).*

International Searching Authority, "Notification of Transmittal of the International Search Report and the Written Opinion of the International Searching Authority, or Declaration," Patent Cooperation Treaty, Jun. 9, 2023, 7 pages, International Application No. PCT/CN2023/083422.

* cited by examiner

PERFORMANCE OF ROW TABLE TO COLUMNAR TABLE REPLICATION

BACKGROUND

The present invention relates to computer systems, and more specifically to improved performance in replicating a row table to a columnar table.

In a row oriented relational database, data is organized in the tables by rows. Each row can be considered a record. This organization is optimized for high concurrency transactional applications (OLTP). In a column oriented database, the data is organized by field, with data associated with a field being kept together. This organization is optimized for fast retrieval of columns of data, as in analytical applications.

However, a business enterprise needs the same data in both row and columnar organization, although not necessarily simultaneously. In order to keep the data in the two database systems concurrent, the business enterprise replicates the row tables from the OLTP database to the columnar tables in the OLAP database warehouse in real time. However, the replay of the row data at the target database tends to be a performance bottleneck, especially during peak hours when transaction activity at the source database is high.

It would therefore be advantageous to provide improved row table to columnar table replication performance.

SUMMARY

A method is provided. Statistics for each columnar table are extracted from an online analytical processing (OLAP) database catalog. A transaction table map is created from transaction log records of an online transaction processing (OLTP) database. The transaction table map includes a counter of log records in a transaction and a timestamp indicating a longevity of the transaction. Based on the counter or the longevity exceeding a predefined threshold, the transaction is transformed, and sent to the OLAP database where it is replayed.

Embodiments are further directed to computer systems and computer program products having substantially the same features as the above-described computer-implemented method.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
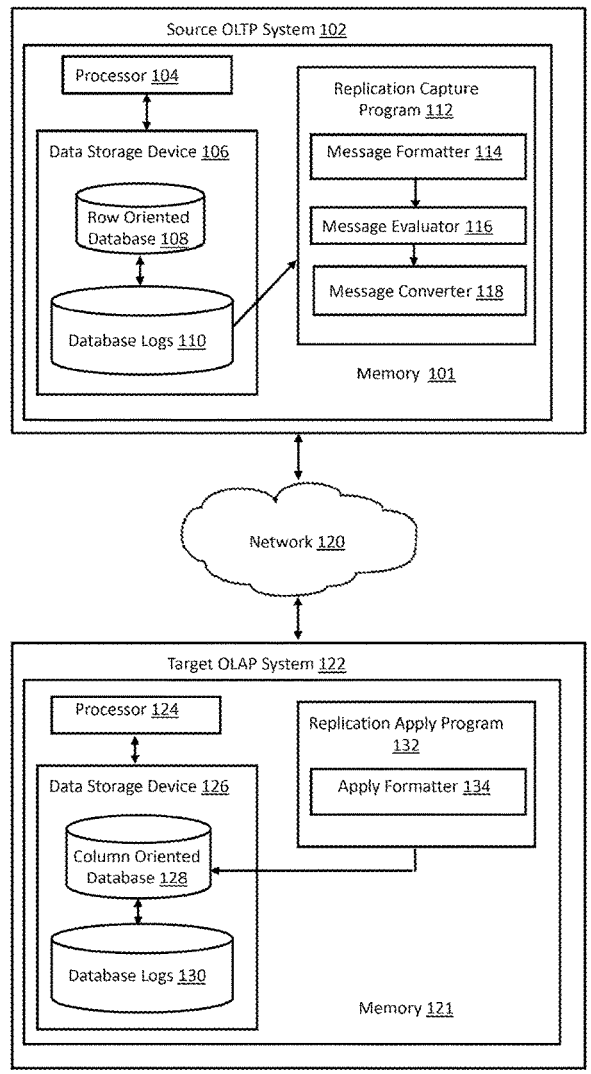
FIG. 1 illustrates the operating environment of a replication apply system, according to an embodiment of the present invention.

Beginning now with, FIG. 1 an illustration of the operating environment of the replication capture program is presented. The environment 100 may include source OLTP system (OLTP system) 102 and a target OLAP system (OLAP system) 122 interconnected via a communication network 120.

The communication network 120 may include various types of communication networks, such as a wide area network (WAN), local area network (LAN), a telecommunication network, a wireless network, a public switched network and/or a satellite network. The communication network 120 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

The OLTP system 102 includes at least one processor 104 and at least one data storage device 106. The OLTP system 102 also includes a memory 101. Data from the data storage device 106, including log records from the database logs 110 and rows from the row oriented database 108 can be loaded into the memory 101 for processing by the replication capture program 112 via the one or more processors 104. Additionally, the memory 101 can include log records from transactions that have not yet completed.

The replication capture program 112 includes a message formatter 114, a message evaluator 116, and a message converter 118. The message formatter 114 sequentially processes each log record in the memory 101, and formats the data in preparation for transmission to the OLAP system 122. The message evaluator 116 uses statistics from the OLAP system 122 to determine whether to transfer the data in a stream or in a sequential load. The message formatter 114 processes each log record in the database logs 110 of the row oriented database 108 and maps each transaction. The message converter 118 creates the table load SQL statements. When the data is ready for replaying at the OLAP system 122, the data is transmitted over the communication network 120. In some embodiments, the replication capture program 112 and the replication apply program 132 are integrated into the software of the row oriented database 108 DBMS and the software of the column oriented database 128 DBMS. In some embodiments, the replication capture program 112 and the replication apply program 132 are provided separately from the respective DBMS software, but are customized according to their respective features.

The OLAP system 122 similarly includes at least one processor 124, and at least one data storage device 126. The OLAP system 122 also includes a system memory 121. Data from the OLTP system 102 is received by the replication apply program 132, and is subsequently formatted by the apply formatter 134 prior to being replayed at the columnar oriented database 128. As it is applied to the columnar oriented database 128, the data is written to the database logs 134 at the target.

Figure 2:
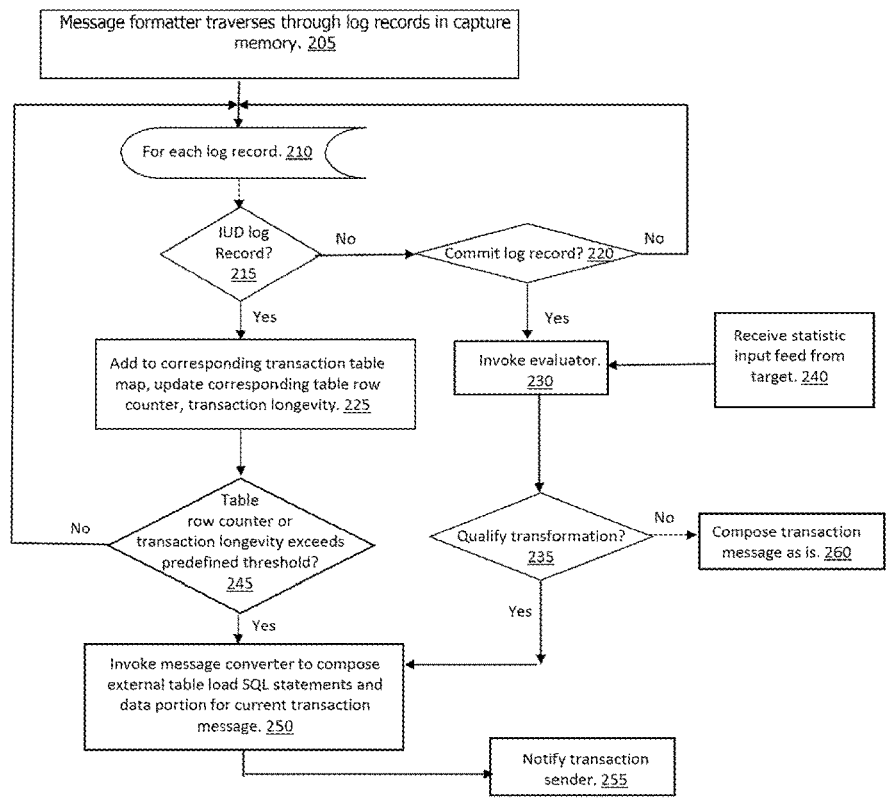
FIG. 2 illustrates a flow chart of replication apply processing from the source database view, in accordance with one or more aspects of the present invention.

FIG. 2 illustrates a flow chart of replication apply processing from the source database view.

At startup, the message evaluator 116 of the replication capture program 112 receives statistic information for each columnar table from the OLAP system 122. The statistics include optimizer information, such as most efficient retrieval paths, e.g., sequential access or access by index, for various SQL statements. These statistics are stored in the DBMS catalog and can be retrieved using SQL statements. The OLAP system 122 can provide the statistics in several ways. For example, the OLTP 102 can poll the OLAP system 122 at predetermined intervals. Similarly, the OLAP 122 can periodically push the statistics to the OLTP 102 at predetermined intervals, or when the statistics are updated. At 205 the message formatter 114 traverses the log records in the memory 101 of the OLTP system 102. Log records in memory are typically those which belong to an open transaction, i.e., a transaction that has not yet completed, either through a commit or a rollback.

At 210, for each log record found, the message formatter 114 locates the operation field in the log record for an indication that the log record is either an insert operation, an update operation, or a delete operation (IUD) (215). If the log record is not an IUD operation, and is not a commit log record (220), the message formatter 114 proceeds to examine the next record for the same criteria.

If, at 215, the log record is an IUD record, then the message formatter 114 adds the log record to the table map corresponding to the transaction (225). The table map records the log records for each transaction, including their timestamps, transaction identifiers, and operation, to determine which transactions can be converted for transmission to the OLAP system 122. The message formatter 114 uses the timestamps to track the transaction longevity, i.e., the elapsed time since the start of the transaction. The table map also includes a table row counter to track how many log records are part of the current transaction.

At 245, the message formatter 114 identifies a transaction as qualified or as-is. If the table row counter or the transaction longevity exceeds a predefined threshold without the transaction having issued a commit or rollback, it is a long transaction (qualified). At 250 the replication capture program 112 invokes the message converter 118 to compose external table load SQL statements with their data portion for the current running transaction. This action is taken to prevent latency during replaying the transaction records at the OLAP 122 from causing performance degradation at the OLTP system 102. At 255, the transaction is sent to the OLAP 122.

Returning now to 220, if the current log record is a commit record, then the replication capture program 112 invokes the message evaluator 116 (230). The message evaluator 116 maintains the statistics extracted from the OLAP 122. For each columnar table, the message evaluator 116 uses the statistics to compare the overhead of the row operations to an external table load (235).

If at 235, the transaction can be transformed into a stream, then at 250 the replication capture program 112 invokes the message converter 118 to compose external table load SQL statements with their data portion for the current running transaction. At 255, the transaction is sent to the OLAP 122. However, if at 235 the transaction does not qualify for transformation, then the transaction is not qualified and is sent as-is to the OLAP system 122.

Figure 3:
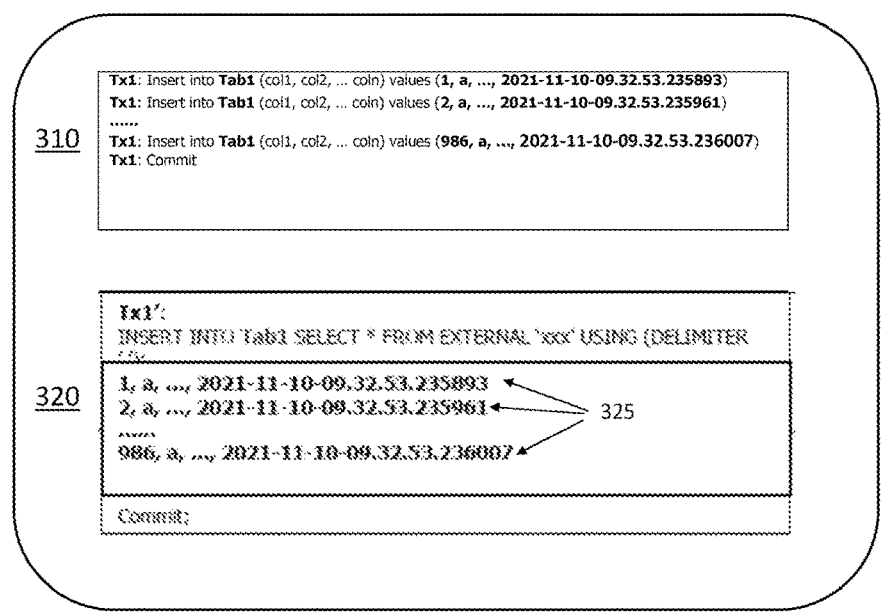
FIG. 3 illustrates a transaction that is transformed for streaming.

FIG. 3 illustrates an example of log records from the database log of the OLTP system 102 (310), and a transaction transformed for streaming to the OLAP system 122 (320). Although FIG. 3 shows the example of "Tx1" it should be understood that log records associated with several different transactions can be interleaved in the database log. The message formatter 116 separates the log records according to transaction identifier and timestamp within transaction identifier, and builds a separate transaction table map for each transaction.

In 310, the transaction, "Tx1" includes a series of individual insert statements, along with the associate table name "Tab1," columns into which data will be inserted, the values of the data to be inserted, and a timestamp associated with the record creation. Finally, the transaction ends with a commit operation.

In 320, the message converter 118 transformed the transaction "Tx1" into an external table load streaming transaction, "Tx1'," that will be transmitted to the OLAP system 122. "Tx1'" now comprises one insert statement that includes each data value from "Tx1" delimited by a comma ",". As in 310, the transaction "Tx1'" ends with a commit operation.

Although not shown in an example, update operations are transformed into a series of delete and insert operations.

For as-is transactions, the 320 transformation does not occur. Instead, the individual transaction records, shown in 310, are transmitted.

Figure 4:
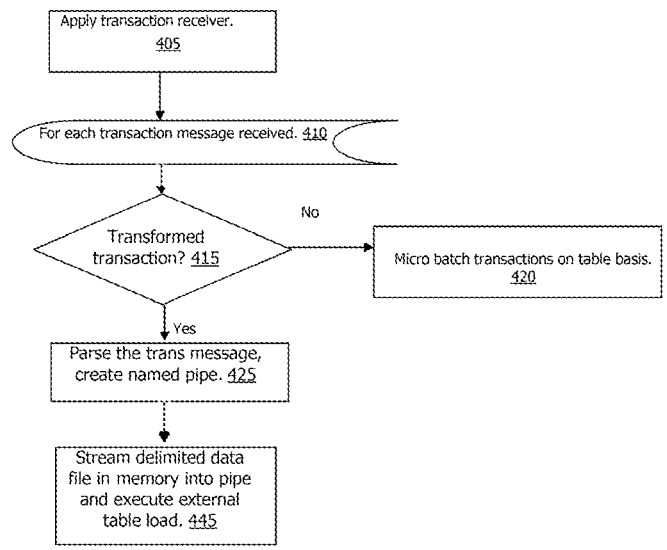
FIG. 4 illustrates a flow chart of replication apply processing from the target database view, in accordance with one or more aspects of the present invention.

FIG. 4 illustrates a flow chart of replication apply processing from the target database view.

At 405, the apply formatter 134 at the OLAP system 122 receives the transaction records from the OLTP system 102.

At 410, for each of the received transaction records, if the record is transformed (415), the apply formatter 134 creates a named pipe for each external load statement in each streaming transaction. The named pipe is uniquely identified, for example, by a combination of transaction identifier from the transaction and table identifier from the DBMS catalog (425). At 445 the apply formatter 134 parses the received streamed transaction. The delimited data (325) is fed to the named pipe created in the OLAP system 122. The named pipe replaces the place holders in the insert statement. The apply formatter 134 then executes the insert statement. At completion, the named pipe is removed.

Returning now to 415, for as-is transactions, the individual transaction records are micro batched in memory and executed on a table basis (420).

Figure 5:
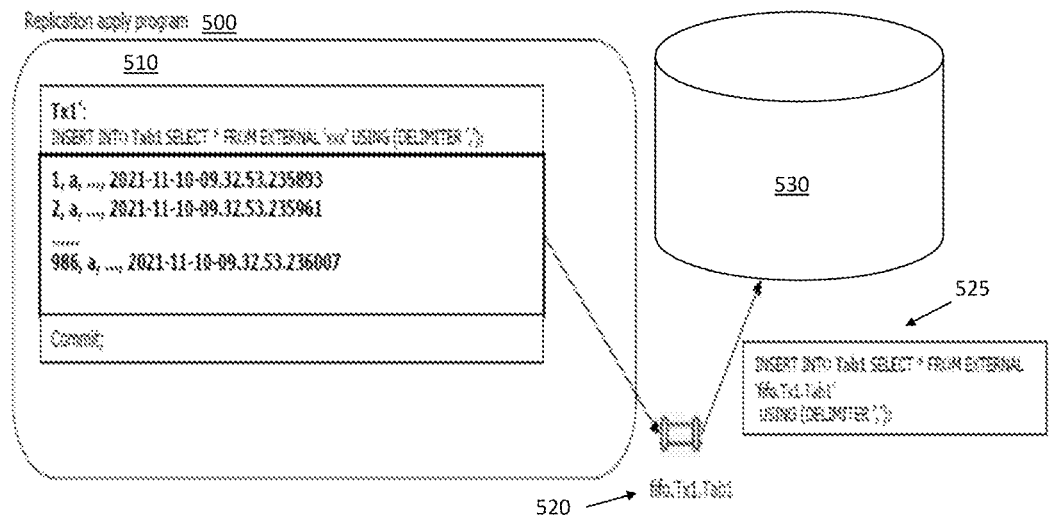
FIG. 5 illustrates applying the transformed transaction.

FIG. 5 illustrates applying the transformed transaction by the replication apply program 132. The received transformed transaction is shown as 510, and includes the transaction identifier, "Tx1'", the insert statement indicating the use of an external load, and the individual fields which are substituted into the insert statement. The named pipe is shown as fifo.Tx1.Tab1 (520). The actual insert statement is shown as 525, with the OLAP system 122 shown as 530.

Figure 6:
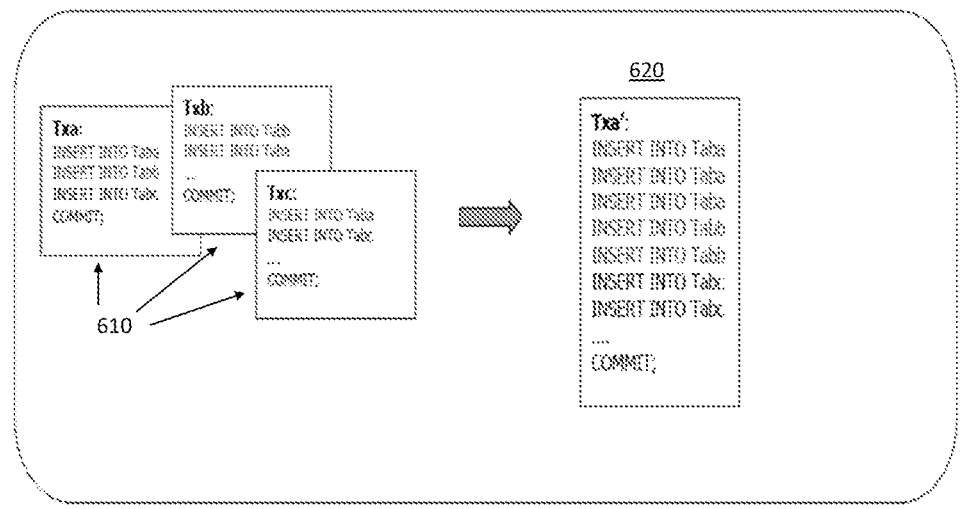
FIG. 6 illustrates as-is transactions at the OLAP system.

FIG. 6 illustrates as-is transactions at the OLAP system 122. Transaction records for each table are indicated by 610. Each of the transactions, "Txa", "Txb", and "Txc" includes insert statements for different tables. For example, "Txa" includes insert statements for "Taba", "Tabb", and "Tabc". The apply formatter 134 sorts each insert statement by table, referred to as micro batching, resulting in one transaction, "Txa'" (620). This may tend to reduce I/O operations and overhead at the DBMS.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be constructed to maintain the proper protection for the invention first described.

What is claimed is:

1. A computer-implemented method, comprising:
extracting statistics for each columnar table from an online analytical processing (OLAP) database catalog, wherein the statistics include optimizer information, retrieval paths indicating access by index, and sequential access;
building a transaction table map from transaction log records of an online transaction processing (OLTP) database, wherein the transaction table map includes the transaction log records for each transaction, along with a transaction identifier, timestamps indicating a longevity of the transaction, wherein the longevity is an elapsed time since a start of the transaction, an operation identifier, and a counter of log records in a transaction;
identifying transactions from the transaction table map with the counter or the longevity exceeding a predefined threshold without the transaction having issued a commit or rollback as qualified transactions;
transforming each qualified transaction into an external table load streaming transaction;
transmitting each the transformed transaction comprising the external table load streaming transaction to an OLAP database, wherein the OLAP database catalog stores statistics for the OLAP database;
replaying the transformed transaction at the OLAP database, further comprising:
receiving the transformed transaction at the OLAP database;
creating a uniquely identified named pipe for each external load statement in the transformed transaction, wherein the named pipe is uniquely identified with a combination of transaction identifier from the transformed transaction and table identifier from the OLAP database catalog, and the named pipe replaces the placeholders in the load statement; and
executing the transformed transaction.

2. The computer-implemented method of claim 1, wherein the statistics identify a transaction that is a candidate for transformation.

3. The computer-implemented method of claim 1, wherein the transforming the transaction further comprises:
creating an external table load statement, comprising an insert operation, an identifier of a data delimiter, a placeholder naming an external table; and
following the creating of the external table load statement, inserting a plurality of data delimited data values from the transaction, and a commit statement.

4. The computer-implemented method of claim 1, wherein based on the transaction not exceeding the counter or the longevity:
sending the log records of the transaction directly to the OLAP system without transformation as an as-is transaction;
sorting, at the OLAP database, the log records of the as-is transaction by table and timestamp within table; and
replaying the log records at the OLAP database.

5. A computer program product, the computer program product comprising a non-transitory tangible storage device having program code embodied therewith, the program code executable by a processor of a computer to perform a method, the method comprising:
extracting statistics for each columnar table from an online analytical processing (OLAP) database catalog, wherein the statistics include optimizer information, retrieval paths indicating access by index, and sequential access;
building a transaction table map from transaction log records of an online transaction processing (OLTP) database, wherein the transaction table map includes the transaction log records for each transaction, along with a transaction identifier, timestamps indicating a longevity of the transaction, wherein the longevity is an elapsed time since a start of the transaction, an operation identifier, and a counter of log records in a transaction;
identifying transactions from the transaction table map with the counter or the longevity exceeding a predefined threshold without the transaction having issued a commit or rollback as qualified transactions;
transforming each qualified transaction into an external table load streaming transaction;
transmitting each transformed transaction comprising the external table load streaming transaction to an OLAP database, wherein the OLAP database catalog stores statistics for the OLAP database;
replaying the transformed transaction at the OLAP database, further comprising:
receiving the transformed transaction at the OLAP database;
creating a uniquely identified named pipe for each external load statement in the transformed transaction, wherein the named pipe is uniquely identified with a combination of transaction identifier from the transformed transaction and table identifier from the OLAP database catalog, and the named pipe replaces the placeholders in the load statement; and
executing the transformed transaction.

6. The computer program product of claim 5, wherein the statistics identify a transaction that is a candidate for transformation.

7. The computer program product of claim 5, wherein the transforming the transaction further comprises:
creating an external table load statement, comprising an insert operation, an identifier of a data delimiter, a placeholder naming an external table; and
following the creating of the external table load statement, inserting a plurality of data delimited data values from the transaction, and a commit statement.

8. The computer-implemented method of claim 1, wherein based on the transaction not exceeding the counter or the longevity;
sending the log records of the transaction directly to the OLAP system without transformation as an as-is transaction;
sorting, at the OLAP database, the log records of the as-is transaction by table and timestamp within table; and
replaying the log records at the OLAP database.

9. The computer program product of claim 5, wherein the enhanced compiler executable code output is based on granularity of inner computation unit requirements of individual threads, and wherein the enhanced scheduler dispatches based on granularity of the thread.

10. A computer system, comprising:
one or more processors;
a memory coupled to at least one of the processors;
a set of computer program instructions stored in the memory and executed by at least one of the processors in order to perform actions of:

extracting statistics for each columnar table from an online analytical processing (OLAP) database catalog, wherein the statistics include optimizer information, retrieval paths indicating access by index, and sequential access;

building a transaction table map from transaction log records of an online transaction processing (OLTP) database, wherein the transaction table map includes the transaction log records for each transaction, along with a transaction identifier, timestamps indicating a longevity of the transaction, wherein the longevity is an elapsed time since a start of the transaction, an operation identifier, and a counter of log records in a transaction;

identifying transactions from the transaction table map with the counter or the longevity exceeding a predefined threshold without the transaction having issued a commit or rollback as qualified transactions;

transforming each qualified transaction into an external table load streaming transaction;

transmitting each transformed transaction comprising the external table load streaming transaction to an OLAP database, wherein the OLAP database catalog stores statistics for the OLAP database;

replaying the transformed transaction at the OLAP database, further comprising:

receiving the transformed transaction at the OLAP database;

creating a uniquely identified named pipe for each external load statement in the transformed transaction, wherein the named pipe is uniquely identified with a combination of transaction identifier from the transformed transaction and table identifier from the OLAP database catalog, and the named pipe replaces the placeholders in the load statement; and executing the transformed transaction.

11. The computer system of claim 10, wherein the statistics identify a transaction that is a candidate for transformation.

12. The computer system of claim 10, wherein the transforming the transaction further comprises:

creating an external table load statement, comprising an insert operation, an identifier of a data delimiter, a placeholder naming an external table; and following the creating of the external table load statement, inserting a plurality of data delimited data values of the transaction, and a commit statement.

13. The computer system of claim 10, wherein:

a transaction not exceeding the counter or the longevity is an as-is transaction;

the log records of an as-is transaction are sent directly to the OLAP database without transformation, sorted by table and timestamp within the transaction, and replayed at the OLAP database.

* * * * *